(12) United States Patent
Tepper et al.

(10) Patent No.: US 11,067,133 B2
(45) Date of Patent: Jul. 20, 2021

(54) FRICTIONAL PIECE

(71) Applicant: Schaeffler Technologies AG & Co. KG, Herzogenaurach (DE)

(72) Inventors: Philipp Tepper, Lauf (DE); Dirk Hofstetter, Durmersheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/492,639

(22) PCT Filed: Mar. 15, 2018

(86) PCT No.: PCT/DE2018/100228
§ 371 (c)(1),
(2) Date: Sep. 10, 2019

(87) PCT Pub. No.: WO2018/171834
PCT Pub. Date: Sep. 27, 2018

(65) Prior Publication Data
US 2020/0049206 A1 Feb. 13, 2020

(30) Foreign Application Priority Data

Mar. 21, 2017 (DE) .......................... 102017106006.5
Mar. 7, 2018 (DE) .......................... 102018105215.4

(51) Int. Cl.
*F16D 13/64* (2006.01)
*F16D 13/72* (2006.01)
(Continued)

(52) U.S. Cl.
CPC ........... *F16D 13/648* (2013.01); *F16D 13/72* (2013.01); *F16D 25/0638* (2013.01);
(Continued)

(58) Field of Classification Search
None
See application file for complete search history.

(56) References Cited

U.S. PATENT DOCUMENTS

| 6,702,088 | B2 | 3/2004 | Kitaori et al. |
| 7,448,483 | B2 * | 11/2008 | Arcot .................... F16D 13/648 |
| | | | 192/107 R |

(Continued)

FOREIGN PATENT DOCUMENTS

| CN | 101517256 A | 8/2009 |
| CN | 110462242 A | 11/2019 |

(Continued)

*Primary Examiner* — Colby M Hansen
(74) *Attorney, Agent, or Firm* — Kevin L. Parks

(57) ABSTRACT

A friction part for a frictionally operating device includes a friction lining carrier and a friction lining. The friction lining includes friction lining pieces arranged in two rows to form an annular friction surface. The friction surface has an inner edge, an outer edge, and a groove set. The groove set has a first stem groove between the inner edge and a first branching point, a first branch groove between the first branching point and a first connecting point, a second branch groove between the first branching point and a second connecting point, a third branch groove between a second branching point and the second connecting point, and a second stem groove between the second connecting point and the outer edge. The first stem groove, and first and second branch grooves form a y shape. The second stem groove, and second and third branch grooves form an inverted y shape.

17 Claims, 6 Drawing Sheets

(51) Int. Cl.
*F16D 25/06* (2006.01)
*F16D 65/12* (2006.01)
*F16D 25/0638* (2006.01)
F16D 65/02 (2006.01)
F16D 69/00 (2006.01)

(52) U.S. Cl.
CPC ......... *F16D 65/127* (2013.01); *F16D 65/128* (2013.01); *F16D 2065/1324* (2013.01); *F16D 2065/1328* (2013.01); *F16D 2069/004* (2013.01); *F16D 2300/0214* (2013.01)

(56) References Cited

U.S. PATENT DOCUMENTS

| | | |
|---|---|---|
| 10,337,562 B2 | 7/2019 | Heitzenrater et al. |
| 2005/0284721 A1 | 12/2005 | Krishnan et al. |
| 2010/0006388 A1* | 1/2010 | Fabricius ................ F16D 13/72 |
| | | 192/113.36 |
| 2020/0049206 A1 | 2/2020 | Tepper et al. |

FOREIGN PATENT DOCUMENTS

| | | |
|---|---|---|
| DE | 10 2005 029 509 A1 | 1/2006 |
| DE | 102010021900 A1 | 12/2011 |
| DE | 10 2013 226 393 A1 | 7/2014 |
| DE | 10 2015 209 793 A1 | 12/2015 |
| DE | 202017106198 U1 | 11/2017 |
| DE | 102017113267 A1 | 12/2017 |
| EP | 2066911 B1 | 6/2009 |
| WO | 2009021569 A1 | 2/2009 |
| WO | 2018171834 A1 | 9/2018 |

\* cited by examiner

FRICTIONAL PIECE

CROSS-REFERENCE TO RELATED APPLICATIONS

This application is the United States National Phase of PCT Appln. No. PCT/DE2018/100228 filed Mar. 15, 2018, which claims priority to German Application Nos. DE102018105215.4 filed Mar. 7, 2018 and DE102017106006.5 filed Mar. 21, 2017, the entire disclosures of which are incorporated by reference herein.

TECHNICAL FIELD

The disclosure relates to a friction part for a frictionally operating device, having an annular friction surface, which has an inner edge and an outer edge. In the friction surface, there is provided at least one groove set with a first groove, which extends from the inner edge to a branching point between the inner edge and the outer edge, and with a second and third groove, which proceed from the branching point.

BACKGROUND

The European patent EP 2 066 911 B1 has disclosed a friction part for a frictionally operating device, having an annular friction surface, which has an inner edge and an outer edge, wherein, in the friction surface, there is provided at least one groove set with a first groove, which extends from the inner edge or the outer edge to a branching point between the inner edge and the outer edge, and with a second and third groove, which each extend from the branching point to the other edge.

SUMMARY

Example aspects of the present disclosure comprise a friction part for a frictionally operating device, having an annular friction surface, which has an inner edge and an outer edge. In the friction surface, there is provided at least one groove set with a first groove, which extends from the inner edge to a branching point between the inner edge and the outer edge, and with a second and third groove, which proceed from the branching point, in that the second and a fourth groove open into a first connecting point, and the third and a fifth groove open into a second connecting point. A groove set includes at least five grooves.

The groove sets are connected to one another at the connecting points. By means of the groove set with the branching point and the two connecting points, the friction coefficient characteristics at certain operating points of the friction part can be improved. Through the combination of the branching point with the two connecting points in the groove set, the cooling and distribution of a fluid during the operation of the friction part can be improved. The fluid is for example oil. At the connecting points, in each case two obliquely running channels, for example, which are formed by the third and the fifth groove, open into an outlet channel, which is formed by the connecting point or which proceeds from the connecting point.

The claimed groove design provides functional advantages, for example, in the case of a high or excessively high engagement friction coefficient. In tests and trials carried out in the context of the present disclosure, it has been found that the friction characteristics of the friction part during operation can be improved by the claimed groove geometry. Through suitable selection of the groove widths and the directions of the obliquely running grooves, it is possible to, for example, preset a desired friction characteristic during the construction of the friction part.

By means of the groove widths and the directions of the obliquely running grooves, the flow of the fluid, for example cooling oil, within the grooves can be optimized. Here, it is sought to conduct the fluid, for example oil, in a tangential direction rather than directly radially outward. In this way, a steel plate area over which flow passes on a steel plate which comes into contact with the grooved friction lining can be maximized. The friction surface includes, in a circumferential direction, for example over the entire circumference, a series of same groove sets, which are connected to one another at the connecting points.

In an exemplary embodiment of the friction part, the connecting points constitute outlet openings at the outer edge. In one embodiment, the fluid or medium emerges directly at the connecting points. In this way, a defined outflow direction can be forcibly imparted to the fluid or medium in a simple manner.

In another exemplary embodiment of the friction part, the connecting points are connected to outlet openings at the outer edge. In this way, the fluid from the third and the fifth groove is firstly merged before emerging at the outlet opening at the outer edge.

In another exemplary embodiment of the friction part, a sixth groove extends from the first connecting point to the outer edge, and a seventh groove extends from the second connecting point to the outer edge. In this exemplary embodiment, a groove set includes at least seven grooves. Here, a first connecting point of a first groove set constitutes a second connecting point of an adjacent groove set. Analogously, the second connecting point of the first groove set constitutes a first connecting point of a third adjacent groove set. The sixth and the seventh groove thus belong to in each case two groove sets.

In another exemplary embodiment of the friction part, the first, sixth and seventh groove extend, for example rectilinearly, along radials. The first groove extends, for example, along a first radial. The sixth and the seventh groove extend, for example, on two further radials. The first radial constitutes an angular bisector with respect to an angle that is enclosed by the two radials of the sixth and of the seventh groove.

In another exemplary embodiment of the friction part, the sixth and the seventh groove have in each case one outlet opening. The fluid, for example cooling oil, emerges at the outer edge via the outlet openings. The fluid enters at the inner edge.

In another exemplary embodiment of the friction part, the grooves are arranged in a y shape at the branching point and the grooves are arranged in each case in an inverted y shape at the connecting points. The grooves arranged in an inverted y shape constitute triangular grooves which merge to form a common outlet channel within the grooved friction surface of the friction part. Each groove set includes only three edge openings, of which one is arranged at the inner edge and two are arranged at the outer edge. The edge openings at the outer edge belong in each case to two adjacent groove sets.

In a further exemplary embodiment, the grooves of the groove set are arranged exclusively in a y shape and an inverse y shape. The second groove is inclined in one circumferential direction of the friction surface relative to a radial through the branching point, and the third groove is inclined in the other circumferential direction of the friction surface relative to the radial through the branching point.

Each groove set is inherently symmetrical in relation to the radial along which the first groove runs. The friction part includes a lining carrier and a friction lining, for example a paper friction lining, which is arranged on the lining carrier and in which the grooves are provided so as to form grooved friction surfaces.

In another exemplary embodiment of the friction part, a friction lining includes multiple friction lining pieces which are arranged on a friction lining carrier such that the grooves are formed between the friction lining pieces. The grooves are thus firstly delimited by the friction lining carrier. Secondly, the grooves are delimited by the friction lining pieces. According to a further aspect, the friction lining pieces are designed to generate the desired groove geometry in a simple manner.

In another exemplary embodiment of the friction part, the friction lining pieces are arranged in two rows which each include only identical friction lining pieces. In this way, the production of the friction parts is simplified. According to a further aspect, the corners of the friction lining pieces are rounded.

In another exemplary embodiment of the friction part, several of the friction lining pieces are pentagonal. With the pentagonal friction lining pieces, it is possible for grooves to be produced in a specific groove pattern which includes grooves arranged in a y shape and grooves arranged in an inverted y shape.

In another exemplary embodiment of the friction part, the pentagonal friction lining pieces have a two-dimensional shape which is made up of a rectangle and an isosceles triangle with a base which coincides with one rectangle side, for example with a relatively long rectangle side. The tips of the pentagonal friction lining pieces are directed radially inward or radially outward.

In another exemplary embodiment of the friction part, the friction lining pieces are arranged in two rows which each include only same friction lining pieces. Only pentagonal friction lining pieces are arranged in at least one of the two rows. Pentagonal friction lining pieces may also be arranged in the other row. It is however also possible for other friction lining pieces, for example triangular friction lining pieces, to be arranged in the other row. By means of the arrangement of the friction lining pieces in two rows, it is possible for the grooves to be arranged in a y shape and in an inverted y shape in the friction lining.

In another exemplary embodiment of the friction part, only pentagonal friction lining pieces with the same shape and size are arranged in a radially inner row. In this way, the production of the friction part with the claimed groove pattern or groove set is simplified.

In another exemplary embodiment of the friction part, only pentagonal friction lining pieces with the same shape and size are arranged in a radially outer row. In this way, the production of the friction part with the claimed groove pattern or groove set can be further simplified.

In another exemplary embodiment of the friction part, all of the friction lining pieces are pentagonal. This provides the advantage that only one type of friction lining piece is required for producing the friction part with the claimed groove pattern or groove set. In this way, the production of the friction part can be further simplified.

In another exemplary embodiment of the friction part, only triangular friction lining pieces with the same shape and size are arranged in a radially outer row. In this way, the length of the radially outer grooves in the groove set can be reduced, if necessary to zero.

In another exemplary embodiment of the friction part, tips of the friction lining pieces in the radially inner row are directed radially outward, and tips of the friction lining pieces in the radially outer row are directed radially inward. In this way, the claimed groove set with grooves arranged in a y shape and grooves arranged in an inverted y shape can be produced.

In another exemplary embodiment of the friction part, the corners of some or all of the friction lining pieces are rounded. The flow through the grooves can be improved in this way.

In another exemplary embodiment of the friction part, the friction surface includes stem grooves which are arranged radially at the inside and which are connected by means of branch grooves to stem grooves arranged radially at the outside. The stem grooves all run in a radial direction. The stem grooves arranged radially at the inside are open at their radially inner ends. At their radially outer ends, the stem grooves arranged radially at the inside are connected to in each case two branch grooves. The stem grooves arranged radially at the outside are open at their radially outer ends. At their radially inner ends, the stem grooves arranged radially at the outside are connected to in each case two branch grooves. The branch grooves run not radially but rather obliquely with respect to a radial or tangential. An angle between the branch grooves and the tangential amounts to, for example, forty degrees. An example range for the angle between the branch grooves and the tangential is thirty to fifty degrees.

In another exemplary embodiment of the friction part, a ratio of the groove widths of the stem grooves to the groove widths of the branch grooves is greater than 0.5. Groove widths refer, for example, to a sum of the groove widths over a radius. The groove widths are measured in each case transversely with respect to the course of the groove. With the claimed ratio, during the course of tests and/or trials carried out in the context of the disclosure with regard to the cooling function of the friction surface, good results have been obtained with different working media, for example cooling media, such as cooling oil. The ratio of the groove widths of the stem grooves to the groove widths of the branch grooves is, for example, greater than 1.0. The ratio of the groove widths of the stem grooves to the groove widths of the branch grooves is, for example, greater than 1.25.

In another exemplary embodiment of the friction part, the ratio of the groove widths of the stem grooves to the groove widths of the branch grooves is less than 6. The ratio of the groove widths of the stem grooves to the groove widths of the branch grooves is, for example, less than 5.8.

In another exemplary embodiment of the friction part, a proportion accounted for by grooves is on average substantially constant over a diameter of the friction surface in a radially inner region of the friction surface and in a radially outer region of the friction surface. The proportion accounted for by grooves corresponds to a ratio between the friction surface, constituted for example by friction lining pieces, and a groove area occupied by the grooves in the friction surface. To determine a course of the proportion accounted for by grooves over the diameter or radius of the friction surface, it is, for example, possible for the groove area to be integrated over circular rings within the friction surface. In conjunction with the proportion accounted for by grooves, the expression "substantially" means that the course of the proportion accounted for by grooves over the radius of the friction surface is idealized. In the case of the idealized course of the proportion accounted for by grooves, corner radii of the friction lining pieces are disregarded.

In another exemplary embodiment of the friction part, the friction surface has, between the radially inner region and the radially outer region, a radially central region in which the proportion accounted for by grooves varies over the diameter. The flow of a fluid through the grooves in the friction surface can thus be influenced. By means of a variation of the proportion accounted for by grooves in the central region, it is, for example, possible for fluid to be built up at an inner diameter of the friction surface. The proportion accounted for by grooves may, for example, be varied over the radius by virtue of the groove widths of the grooves being varied.

In another exemplary embodiment of the friction part, the radially inner region of the friction surface occupies between 30 and 70 percent of a radial dimension R of the friction surface. The radial dimension R of the friction surface corresponds to a radial spacing between the inner diameter and the outer diameter of the friction surface. The radially inner region of the friction surface thus occupies at least approximately one third of R. The radially inner region of the friction surface is furthermore no greater, or only insignificantly greater, than two thirds of R.

In another exemplary embodiment of the friction part, the radially central region of the friction surface extends at a maximum up to eighty-five percent (85%) of the radial dimension R of the friction surface. The radially central region of the friction surface may extend only to a maximum of eighty-one percent (81%) of the radial dimension R. The rest of the friction surface is then occupied by the radially outer region of the friction surface. In the radially outer region, as in the radially inner region, there are arranged only stem grooves, which run in a radial direction, for example. The branch grooves are arranged in the radially central region of the friction surface.

In another exemplary embodiment of the friction part, the radially central region of the friction surface extends at a minimum up to fifty percent (50%) of the radial dimension R of the friction surface. The rest of the radial dimension R of the friction surface is occupied by the radially outer region of the friction surface.

In another exemplary embodiment of the friction part, the radially central region of the friction surface extends between fifty-five and eighty-five percent (55-85%) of the radial dimension R of the friction surface. In the determination of the dimension limits of the ranges, consideration has been given to manufacturing aspects, for example. Here, a focus has also been placed on achieving that the friction lining pieces for forming the friction surface can be produced economically in large unit quantities, for example by punching. Furthermore, in the determination of the ratio and of the proportions accounted for by grooves, or courses of the proportions accounted for by grooves, over the radial dimension of the friction surface, as described below, a focus has been placed on the friction characteristics. Furthermore, in this variant, the distribution of the cooling medium is improved. An undesired floating effect can be reduced in this way. In the tests and trials carried out in the context of the present invention, a range from fifty-eight to sixty-eight percent (58-68%) of R has been obtained as a lower limit of the radially central region of the friction surface. A range from seventy-two to eighty-one percent (72-81%) of R has proven to be advantageous as an upper limit.

In another exemplary embodiment of the friction part, the proportion accounted for by grooves in the radially inner region makes up on average between forty-five and fifty-five percent (45-55%) of the friction surface. A range between forty-six and fifty-two percent (46-52%) on average is, for example, the proportion accounted for by grooves in the radially inner region.

In another exemplary embodiment of the friction part, the proportion accounted for by grooves in the radially central region steadily decreases. In this way, the flow through the grooves can be influenced, for example slowed or built up.

In another exemplary embodiment of the friction part, the proportion accounted for by grooves in the radially outer region makes up on average between twenty-five and forty percent (25-40%) of the friction surface. A range between twenty-seven and thirty-seven percent (27-37%) on average is preferred for the radially outer region.

In another exemplary embodiment of the friction part, the radially central region of the friction surface extends between thirty-five and seventy-five percent (35-75%) of the radial dimension R of the friction surface. In this variant, it is possible for very similar or identical friction lining pieces to be used to form the friction surface. In this way, the production costs are reduced. A range from thirty-five to forty-two percent (35-42%) of R has proven to be advantageous as a lower limit for the radially central region of the friction surface. A range from seventy to seventy-five percent (70-75%) of R has proven to be advantageous as an upper limit for the radially central region of the friction surface.

In another exemplary embodiment of the friction part, the proportion accounted for by grooves in the radially inner region makes up on average between twenty-five and forty-five percent (25-45%) of the friction surface. A range from thirty to forty percent (30-40%) of the friction surface on average is preferred for the proportion accounted for by grooves in the radially inner region.

In another exemplary embodiment of the friction part, the proportion accounted for by grooves in the radially central region initially steadily increases, is then constant, and finally steadily decreases. For the steady increase of the proportion accounted for by grooves in the radially central region of the friction surface, a range from thirty-five to forty-two percent (35-42%) of R has proven to be advantageous for a lower limit. A range from fifty to fifty-five percent (50-55%) of R has proven to be advantageous for an upper limit. For the steadily falling course of the proportion accounted for by grooves in the central region of the friction surface, a range from sixty to sixty-five percent (60-65%) of R has proven to be advantageous as a lower limit. A range from seventy to seventy-five percent (70-75%) of R has proven to be advantageous for the upper limit.

In another exemplary embodiment of the friction part, the constant proportion accounted for by grooves in the radially central region is on average greater than sixty percent (60%). The constant proportion accounted for by grooves in the central region is, for example, on average greater than seventy percent (70%).

In another exemplary embodiment of the friction part, the proportion accounted for by grooves in the radially outer region makes up on average between twenty-five and forty-five percent (25-45%) of the friction surface. In the radially outer region, the proportion accounted for by grooves, for example, makes up on average between thirty and forty percent (30-40%) of the friction surface.

In another exemplary embodiment of the friction part, the radially central region of the friction surface extends between thirty and sixty percent (30-60%) of the radial dimension R of the friction surface. This variant provides the advantage, inter alia, that the cooling medium can be discharged radially to the outside more effectively, e.g., with a greater flow rate and/or more quickly. A range from thirty to forty percent (30-40%) of R has proven to be advantageous as a lower limit in the radially central region of the friction surface. A range from fifty to sixty percent (50-60%) of R has proven to be advantageous as an upper limit.

In another exemplary embodiment of the friction part, the proportion accounted for by grooves in the radially inner region makes up on average between fifteen and thirty percent (15-30%) of the friction surface. A range from seventeen to twenty-seven percent (17-27%) of the friction surface on average is, for example, the proportion accounted for by grooves in the radially inner region.

In another exemplary embodiment of the friction part, the proportion accounted for by grooves in the radially central region steadily increases. In this way, the flow through the grooves during the operation of the friction part can be influenced in an effective manner.

In another exemplary embodiment of the friction part, the proportion accounted for by grooves in the radially outer region makes up on average between forty-five and fifty-five percent (45-55%) of the friction surface. The grooves occupy, in the radially outer region, on average, approximately half of the friction surface.

In another exemplary embodiment of the friction part, the friction part is a plate for a multiplate clutch or a multiplate brake. The disclosure also relates to a clutch with at least one friction part as described above. The clutch may be a wet-running multiplate clutch.

BRIEF DESCRIPTION OF THE DRAWINGS

Further advantages, features and details of the disclosure will emerge from the following description, in which various exemplary embodiments are described in detail with reference to the drawings, in which.

DETAILED DESCRIPTION

FIGS. 1 to 5 illustrate various exemplary embodiments of a friction part 1; 31; 51; 61; 71. The same reference designations are used to denote identical or similar parts. In order to avoid repetitions, common features of the exemplary embodiments will be described only once.

Figure 1:
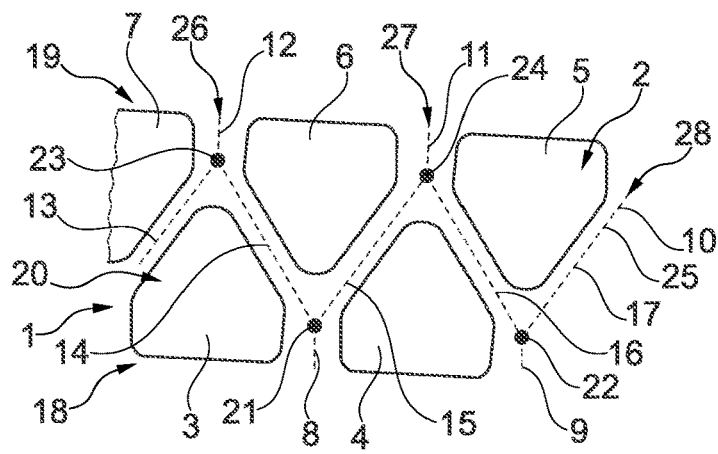
FIG. 1 shows a detail of a friction part for a frictionally operating device, having an annular friction surface which includes a groove pattern or a groove set with grooves which proceed from branching points and which are merged at connecting points, as per a first exemplary embodiment.
Figure 2:
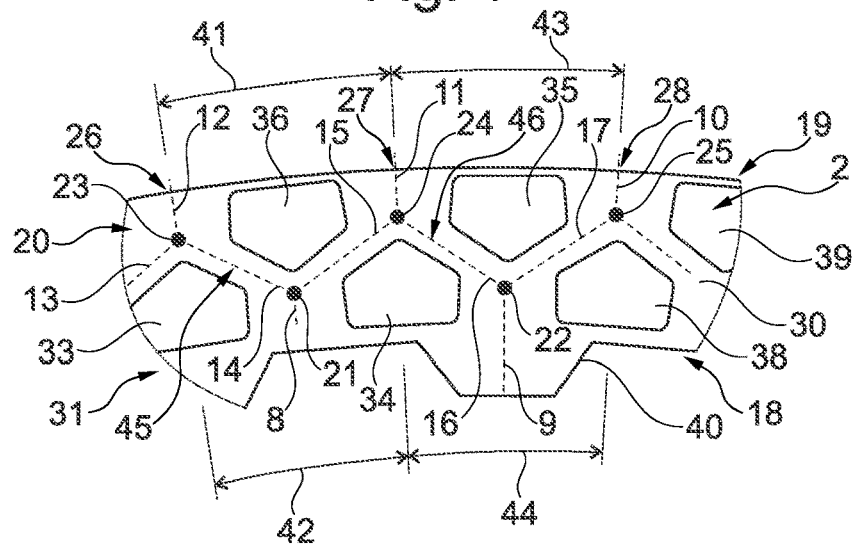
FIG. 2 shows a friction lining carrier with pentagonal friction lining pieces, which are designed and arranged such that a groove pattern as illustrated in FIG. 1 is realized, wherein the friction lining pieces have the same design.

The friction part 1 illustrated in FIG. 1 includes a friction lining 2, which is made up of individual friction lining pieces 3 to 7. Here, the friction lining pieces 3 to 7 are adhesively bonded to a friction lining carrier 30 (ref. FIG. 2) such that intermediate spaces between the friction lining pieces 3 to 7 form grooves 8 to 17.

The grooves 8 to 17 are, in the direction of the plane of the drawing, delimited at the bottom by the friction lining carrier 30 and permit the passage of a fluid, for example a cooling medium, such as oil, from an inner edge 18 to an outer edge 19 of the friction lining 2. The friction lining 2 forms a grooved annular friction surface between the inner edge 18 and the outer edge 19. The fluid enters at the inner edge 18. The fluid exits at the outer edge 19.

The friction part 1 is a plate of a multiplate clutch. The plate is equipped, on both sides, with a friction lining 2 for forming a friction surface 20. In a multiplate clutch, the friction part 1 is arranged between two steel plates, which can be frictionally connected to the friction part 1 in order to transmit a torque.

The grooves 8 to 17 are arranged in an identical or similar pattern in FIGS. 1 to 4 and are therefore denoted by the same reference designations in FIGS. 1 to 4. In the groove pattern, the grooves 7, 8 constitute first grooves which proceed in a radial direction from the inner edge 18. The first grooves 8, 9 open into branching points 21, 22. A second groove 14 and a third groove 15 proceed from the branching point 21. The first groove 8 forms a Y shape with the second groove 14 and the third groove 15.

A fifth groove 16 and an eighth groove 17 proceed from the second branching point 22. The first groove 9 is arranged in a y shape with the fifth groove 16 and the eighth groove 17.

The second groove 14 opens, together with the fourth groove 13, into a first connecting point 23. The third groove 15 opens, together with the fifth groove 16, into a second connecting point 24. A sixth groove 12 extends from the first connecting point 12 to the outer edge 19. A seventh groove 11 extends from the second connecting point 24 to the outer edge 19. The grooves 13, 14, 12 and 15, 16, 11 of the connecting points 23 and 24 are arranged in an inverted y shape.

The grooves 12, 11, 10 proceeding from the connecting points 23 to 25 run in each case along a radial. The free ends of the grooves 12, 11, 10 form outlet openings 26, 27, 28 at the outer edge 19.

The grooves 8 to 17 are indicated by means of dashed lines in FIGS. 1 to 4. A groove width of the grooves 8 to 17 is defined by the spacings of the adjacent friction lining pieces 3 to 7. The branching points 21, 22 and the connecting points 23 to 25 are indicated by dots.

The friction lining pieces 3 and 4 are arranged in a radially inner row. Here, the friction lining pieces 3, 4 have the shape of pentagons which are made up of a rectangle and of an isosceles triangle with a base which coincides with a relatively long rectangle side. The tip of the pentagonal friction lining pieces 3, 4 is directed radially outward.

The friction lining pieces 5, 6, 7 are arranged in a radially outer row. Here, the friction lining pieces 5 to 7 have the same shape as the friction lining pieces 3, 4. However, the tips of the pentagonal friction lining pieces 5 to 7 are directed radially inward. This arrangement yields the y-shaped and inverse y-shaped course of the grooves 8 to 17.

The first grooves 8, 9 form inlet channels or inlet grooves for cooling oil at the inner edge 18. The grooves 10 to 12, which proceed from the connecting points 25, 24, 23, form outlet channels or outlet grooves with the outlet openings 28, 27, 26 at the outer edge 19.

The pentagonal friction lining pieces 3 to 7 are for example punched out or cut out of conventional paper friction linings. The corners of the pentagonal friction lining pieces 3 to 7 are all rounded. The friction lining pieces 7, 3; 3, 6; 6, 4; 4, 5 all have the same spacing to form the obliquely running grooves 13, 14, 15, 16.

The friction lining pieces 3, 4 which define the groove width of the first groove 8 are spaced apart further from one another to form a relatively large groove width. The friction lining pieces 5, 6 and 6, 7, which delimit the grooves 11, 12, are likewise spaced apart further from one another in order to form a relatively large groove width.

The friction part 31 illustrated in FIG. 2 includes friction lining pieces 33 to 36 and 38, 39 for forming a friction lining 2. The friction lining pieces 33 to 36, 38, 39 are, as in the case of the friction part 1 illustrated in FIG. 1, of pentagonal form with rounded corners and adhesively bonded onto a friction lining carrier 30.

The friction lining carrier 30 has an internal toothing 40 which serves for forming a rotationally conjoint connection to a plate carrier or a shaft. The friction lining carrier 30 is formed, for example, from sheet metal. Grooves 8 to 17 are formed between the friction lining pieces 33 to 36, 38, 39. The friction lining pieces 33 to 36 correspond to the friction lining pieces 3 to 6 in FIG. 1.

A groove set 45 is indicated by means of double arrows 41, 42. A groove set 46 is indicated by means of double arrows 43, 44. The groove set 45 includes the groove 8 as first groove and the grooves 14 and 15 as second and third groove. The grooves 14 and 15 proceed from the branching point 21. The groove set 45 includes the grooves 13 and 16 as fourth and fifth groove, which open, with the grooves 14 and 15, into the connecting points 23 and 24.

Here, the groove 13 constitutes the third groove for a groove set 45 which is adjacent on the left-hand side in FIG. 2. The groove 16 constitutes the second groove for the groove set 46 that is adjacent on the right-hand side in FIG. 2. The two adjacent groove sets 45 and 46 are connected to one another by means of the connecting point 24 and the groove 11.

Figure 3:
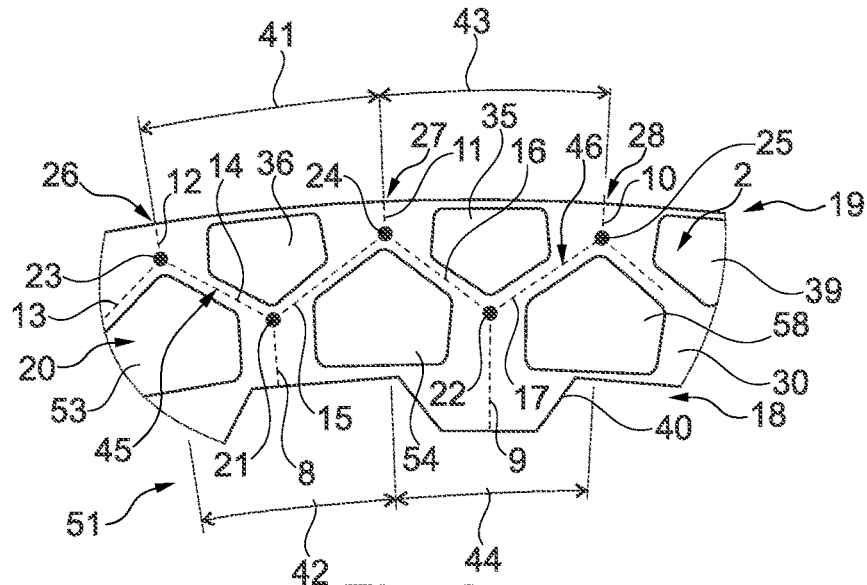
FIG. 3 shows an exemplary embodiment similar to that in FIG. 2, in which two types of pentagonal friction lining pieces of different size have been combined with one another.

The friction part 51 illustrated in FIG. 3 includes, in the radially inner row, pentagonal friction lining pieces 53, 54, 58 which, in a radial direction, have a greater extent than the friction lining pieces 33, 34 and 38 of the friction part 31 illustrated in FIG. 2. An unchanged radial spacing between the inner edge 18 and the outer edge 19 results in a smaller groove width of the obliquely running grooves 13, 14, 15, 16, 17 between the friction lining pieces 53, 36; 36, 54; 54, 35; 35, 58.

By means of the dimensions of the friction lining pieces 33 to 36, 38, 39 in a radial direction and also (not illustrated) in a circumferential direction, the groove widths and thus the throughflow resistances can be varied and set in virtually any desired manner. The smaller the groove width, the greater the throughflow resistance.

Figures 4, 5:
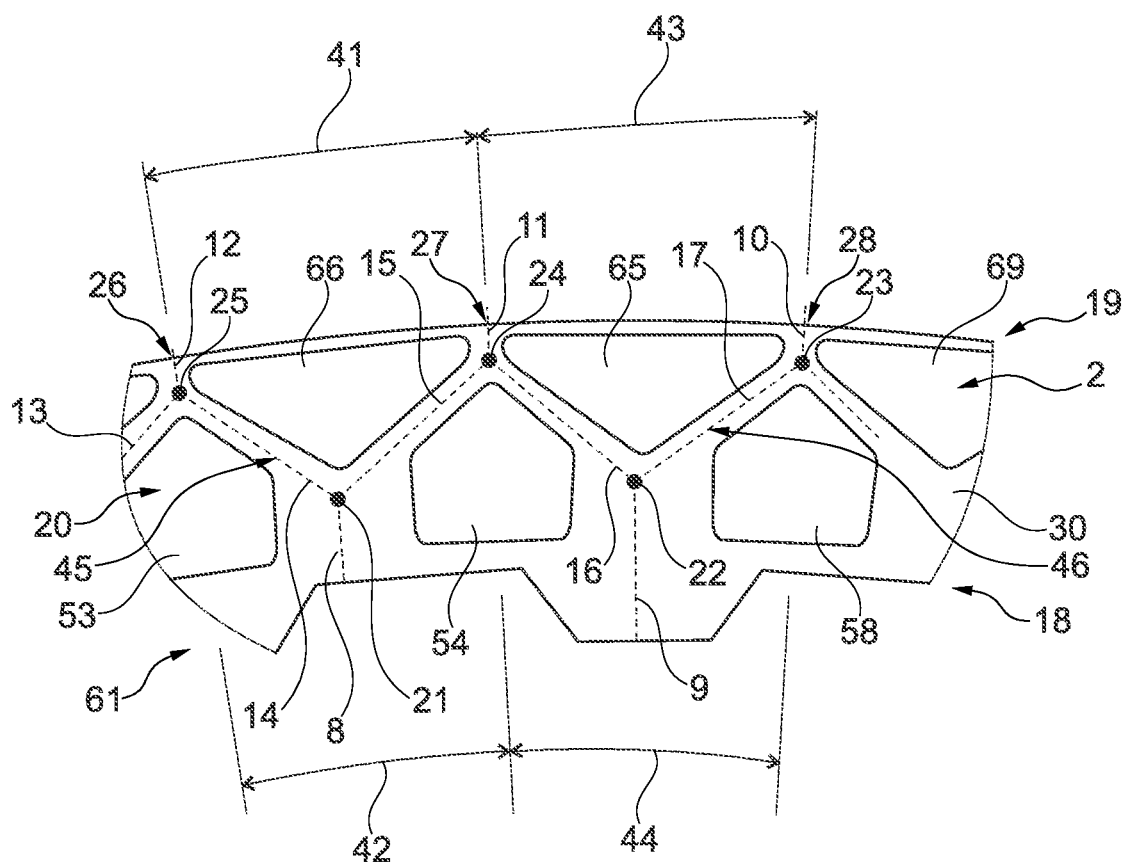
FIG. 4 shows an exemplary embodiment similar to that in FIG. 3, in which pentagonal friction lining pieces have been combined with triangular friction lining pieces.
FIG. 5 shows a friction part similar to that in FIG. 2, wherein, in order to illustrate the groove pattern, most of the reference lines and reference designations used in FIG. 2 have been omitted.

In the case of the friction part 61 illustrated in FIG. 4, triangular friction lining pieces 65, 66, 69 are arranged in the radially outer row of the friction lining 2. The triangular friction lining pieces 65, 66, 69 are all in the shape of triangles with rounded corners. The triangular shape of the friction lining pieces 65, 66, 69 has the result that the grooves 10 to 12 to the outlet openings 28, 27, 26 are shorter than in the case of the friction parts 31 and 51 illustrated in FIGS. 2 and 3. Depending on the shape of the friction lining pieces 65, 66, 69, the grooves 10 to 12 may also have a length of zero or approximately zero. The outlet openings 26 to 28 then practically coincide with the connecting points 25, 24, 23.

In the case of the friction part 71 illustrated in FIG. 5, friction lining pieces 33, 36 and 38 which are similar or identical to those in the case of the friction part 31 illustrated in FIG. 2 have been fastened to a friction lining carrier 30 to form a grooved friction surface 70. However, by contrast to FIG. 2, for improved illustration of the groove pattern or groove design, the dashes and dots for indicating the grooves, the branching points and the connecting points, and the associated reference lines and reference designations, have not been illustrated in FIG. 5.

Figure 6:
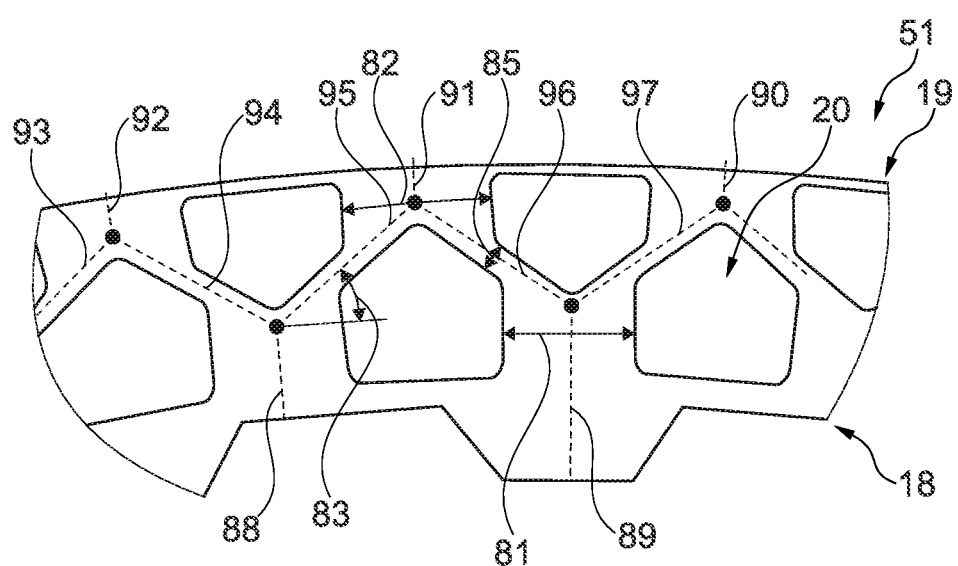
FIG. 6 shows the friction part from FIG. 3 with further reference designations and with double arrows for explanation of an additional first variant.

FIG. 6 illustrates the friction part 51 from FIG. 3 with, in part, different reference designations. Radially inner stem grooves 88, 89 correspond to the grooves 8, 9 in FIG. 3. Radially outer stem grooves 90, 91, 92 correspond to the grooves 10 to 12 in FIG. 3. Branch grooves 93 to 97 correspond to the grooves 13 to 17 in FIG. 3.

A groove width of the radially inner stem grooves 88, 89 is indicated by double arrow 81. A groove width of the radially outer stem grooves 90 to 92 is indicated by double arrow 82.

The stem grooves 88 to 92 run in a radial direction. The branch grooves 93 to 97 run obliquely with respect to a radial or tangential direction. An angle between the branch groove 95 and a tangential direction is indicated by double arrow 83. The angle 83 amounts to approximately forty degrees (40°) in FIG. 6. The groove width of the branch grooves 93 to 97 is indicated by means of a double arrow 85.

Tests and trials were carried out in the context of the present invention in order to determine an optimum ratio of the stem grooves 88 to 92 with respect to the branch grooves 93 to 97.

With regard to the stem grooves 88 to 92, it was found that the stem grooves 88 to 92 should have at least a groove width 81, 82 of 2.5 millimeters. At the same time, the groove width 81, 82 of the stem grooves 88 to 92 should be no greater than 5.8 millimeters. For the groove width 85 of the branch grooves 93 to 97, 1.0 millimeter can be stated as a minimum value. A value of 2.0 millimeters has proven to be advantageous as a maximum value for the groove width 85 of the branch grooves 93 to 97.

The above-stated minimum and maximum values for the groove widths 81, 82, 85 of the stem grooves 88 to 92 and of the branch grooves 93 to 97 are dependent on the radius or diameter of the friction surface, i.e., on the radial spacing between the inner edge 18 and the outer edge 19 of the friction surface 20. Therefore, in the context of the present disclosure, a minimum ratio and a maximum ratio between the groove widths 81, 82 of the stem grooves 88 to 92 and the groove widths 85 of the branch grooves 93 to 97 have been determined. The minimum ratio of the groove widths 81, 82 of the stem grooves 88 to 92 to the groove widths 85 of the branch grooves 93 to 97 amounts to 1.25. The maximum ratio between the groove widths 81, 82 of the stem grooves 88 to 92 and the groove widths 85 of the branch grooves 93 to 97 amounts to 5.8.

Figure 7:
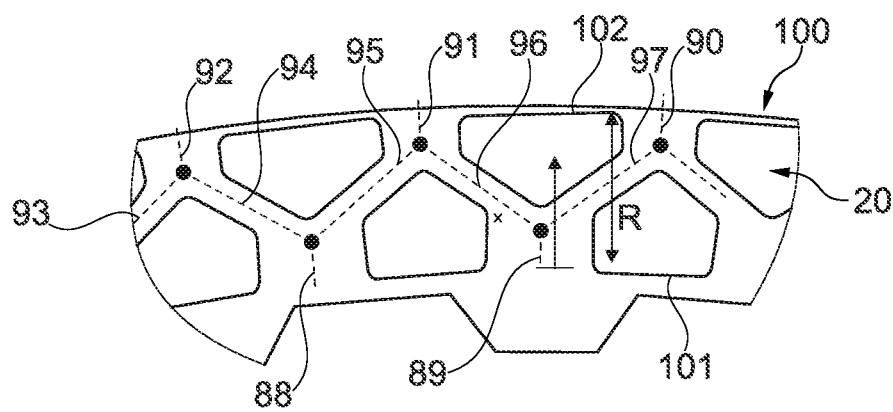
FIG. 7 shows a friction part similar to that in FIG. 3 for the purposes of illustrating an additional second variant.
Figure 8:
FIG. 8 shows a Cartesian coordinate diagram in which the course of a proportion accounted for by grooves over a diameter of the friction part from FIG. 7 is plotted.
Figure 9:
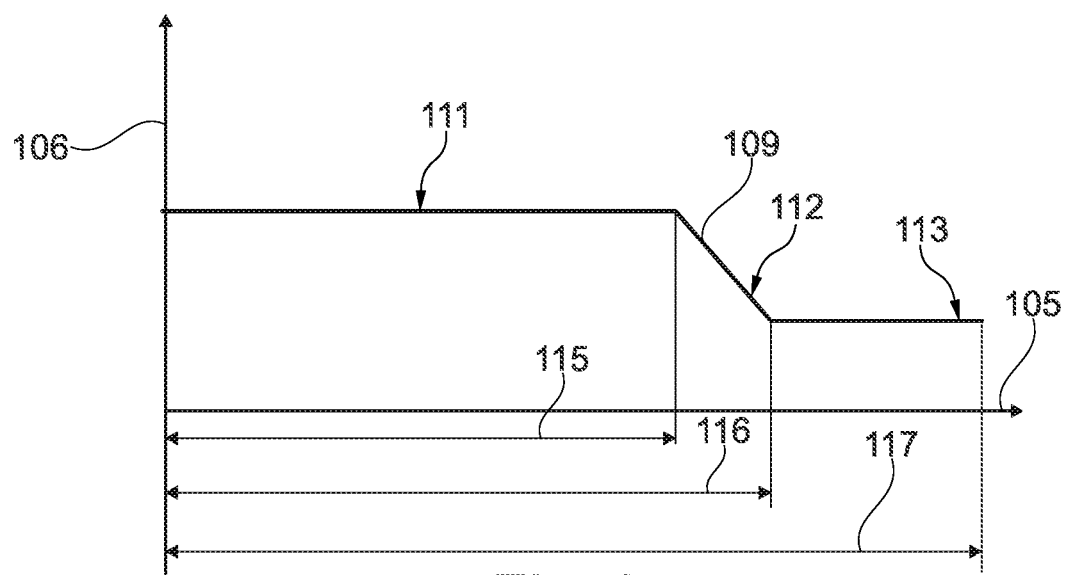
FIG. 9 shows the same coordinate diagram as in FIG. 8 with an idealized course of the proportion accounted for by grooves over the diameter of the friction part.
Figure 10:
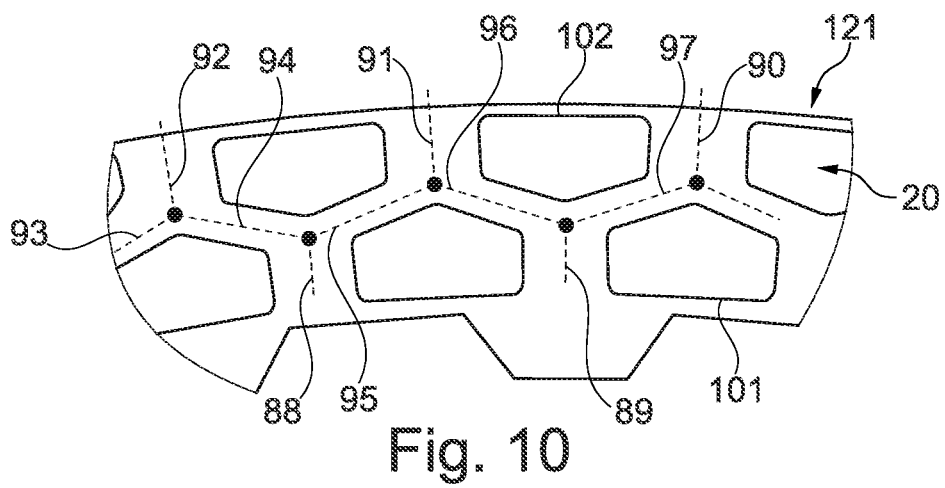
FIGS. 10 to 12 show illustrations similar to those in FIGS. 7 to 9 for the purposes of illustrating an additional third variant.
Figure 11:
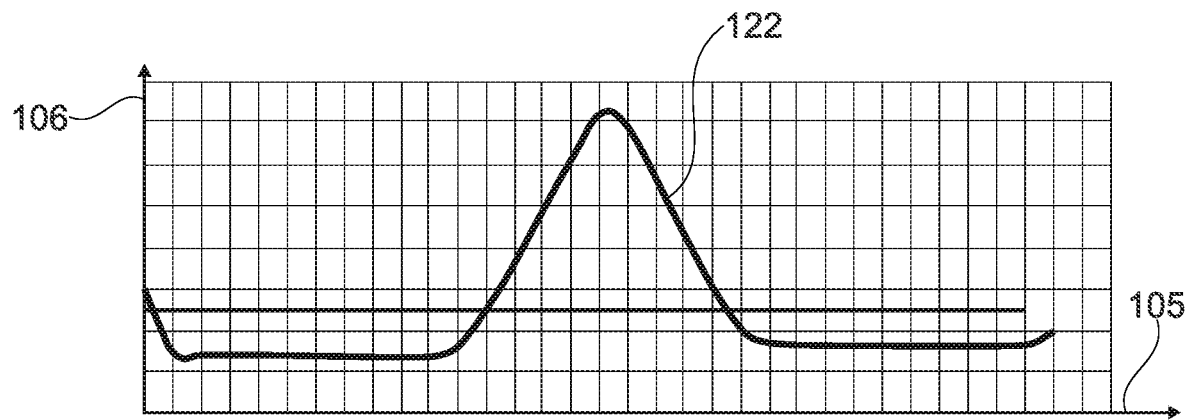
Figure 12:
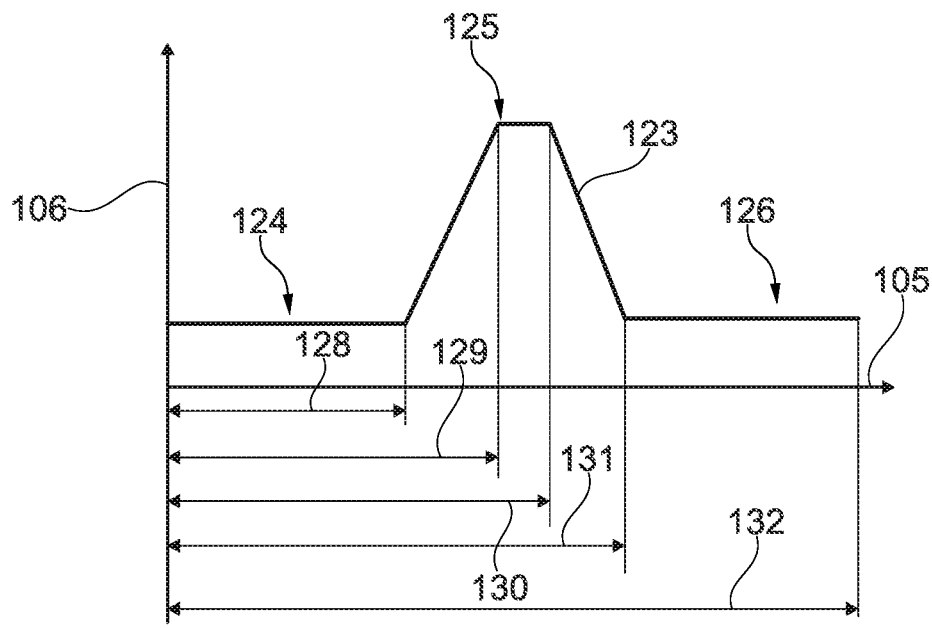
Figure 13:
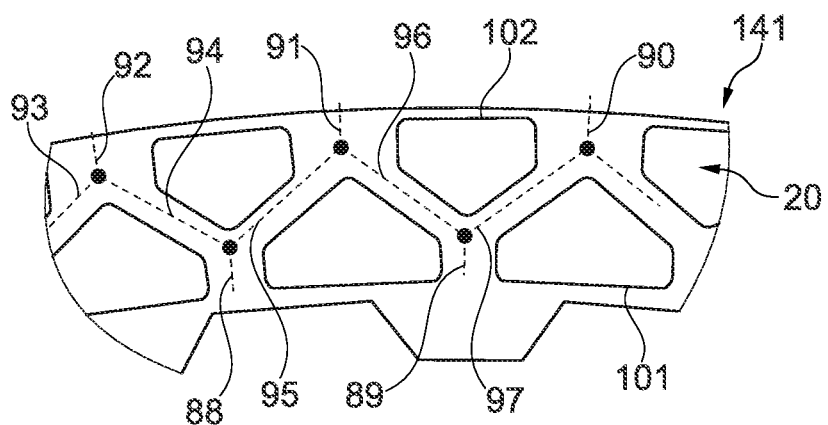
FIGS. 13 to 15 show illustrations similar to those in FIGS. 7 to 9 for the purposes of illustrating an additional fourth variant.

Three additional variants of friction parts 100; 121; 141 are illustrated in FIGS. 7 to 9, 10 to 12 and 13 to 15. The friction part 100 in FIG. 7 is similar to the friction part 51 in FIG. 3. The friction part 121 in FIG. 10 is similar to the friction part 31 in FIG. 2. The friction part 141 in FIG. 13 is similar to the friction part 71 in FIG. 5.

The friction surface 20 of the friction parts 100; 121; 141 is, as in the case of the friction parts 51; 31; 71 in FIGS. 3, 2 and 5, formed by friction lining pieces (not designated in any more detail) which are shaped, and spaced apart from one another, so as to form radially running stem grooves 88 to 92, which are connected to one another by branch grooves 93 to 97. The friction surface 20 formed by the friction lining pieces is delimited radially at the inside by an inner diameter 101 and radially at the outside by an outer diameter 102.

FIGS. 8, 9; 11, 12; 14, 15 illustrate Cartesian coordinate diagrams with an x axis 105 and a y axis 106. The diameter of the friction surface 20 between the inner diameter 101 and the outer diameter 102 is plotted with suitable length units, such as millimeters, on the x axis. A proportion accounted for by grooves of the friction surface 20 is plotted in percent on the y axis.

Figure 14:
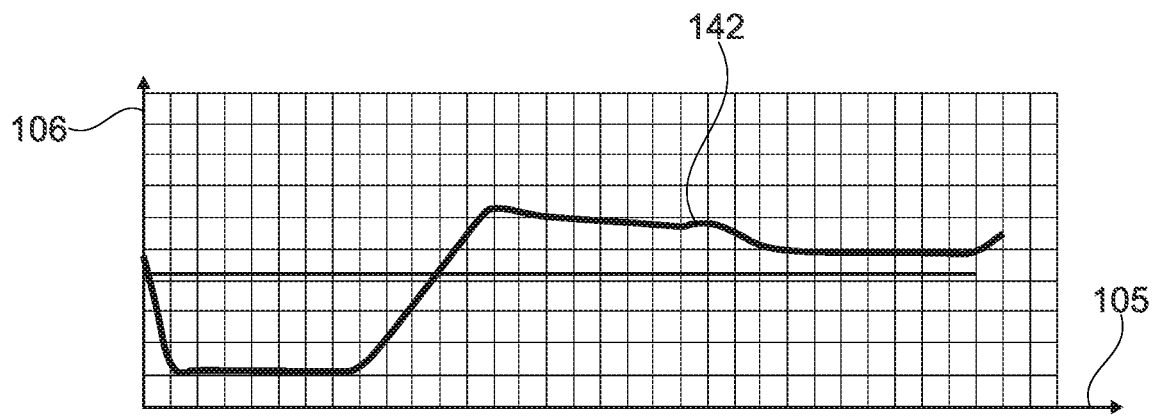

Courses 108; 122; 142 of the proportion accounted for by grooves over the diameter of the friction surface 20 are plotted in FIGS. 8, 11 and 14. Idealized courses 109; 123; 143 of the proportion accounted for by grooves over the diameter of the friction surface are plotted in FIGS. 9, 12 and 15. In the case of the idealized courses 109; 123; 143, corner radii of the friction lining pieces, which are also referred to as pads, have been disregarded.

The proportions accounted for by grooves 106 have been determined, proceeding from the inner diameter 101, by integration over the friction surface 20 in an x direction illustrated by means of an arrow in FIG. 7. The spacing between the inner diameter 101 and the outer diameter 102 of the friction surface 20 is denoted in FIG. 7 by means of a double arrow R. The spacing R corresponds, with regard to the friction surface 20, to a radial dimension over which integration is performed in the x direction.

The idealized courses 109; 123; 143 of the proportion accounted for by grooves illustrated in FIGS. 9; 12; 15 each include a radially inner region 111; 124; 144, a radially central region 112; 125; 145, and a radially outer region 113; 126; 146.

In the variant illustrated in FIG. 9, the proportion accounted for by grooves in the radially inner region 111 amounts to on average between forty-six and fifty-two percent (46-52%). In the radially outer region 113, the proportion accounted for by grooves amounts to on average between twenty-seven and thirty-seven percent (27-37%). In the radially central region 112, the proportion accounted for by grooves steadily decreases.

In FIG. 9, it is indicated by double arrow 115 that the radially inner region 111 extends from the inner diameter 101 of the friction surface 20 in the x direction to fifty-eight to sixty-eight percent (58-68%) of R. By means of a double arrow 116, it is indicated that the radially central region 112 extends from the radially inner region 111 in the x direction to seventy-two to eighty-one percent (72-81%) of R. In FIG. 9, a double arrow 117 is used to indicate the dimension R, i.e., the spacing between the inner diameter 101 and the outer diameter 102 of the friction surface 20.

In the variant illustrated in FIG. 12, the proportion accounted for by grooves in the radially inner region 124 of the friction surface 20 amounts to on average thirty to forty percent (30-40%). In the radially central region 125, proceeding from the radially inner region 124, the proportion accounted for by grooves initially steadily increases and then remains constant at a proportion accounted for by grooves which is on average greater than seventy percent (>70%). Thereafter, in the radially central region 125 of the friction surface 20, the proportion accounted for by grooves steadily decreases to the radially outer region 126. In the radially outer region 126 of the friction surface 20, the proportion accounted for by grooves amounts to on average a constant thirty to forty percent (30-40%), as in the radially inner region 124.

Double arrow 128 indicates in FIG. 12 that the radially inner region 124 extends from the inner diameter 101 of the friction surface 20 in the x direction to thirty-five to forty-two percent (35-42%) of R. Double arrow 129 indicates that the proportion accounted for by grooves in the central region 125 increases from the radially inner region 124 to fifty to fifty-five percent (50-55%) of R.

Double arrow 130 indicates in FIG. 12 that the proportion accounted for by grooves in the radially central region 125 remains constant up to sixty to sixty-five percent (60-65%) of R. Double arrow 131 indicates in FIG. 12 that the proportion accounted for by grooves in the radially central region 125 decreases steadily to seventy to seventy-five percent (70-75%) of R. The dimension R is indicated in FIG. 12 by double arrow 132.

Figure 15:
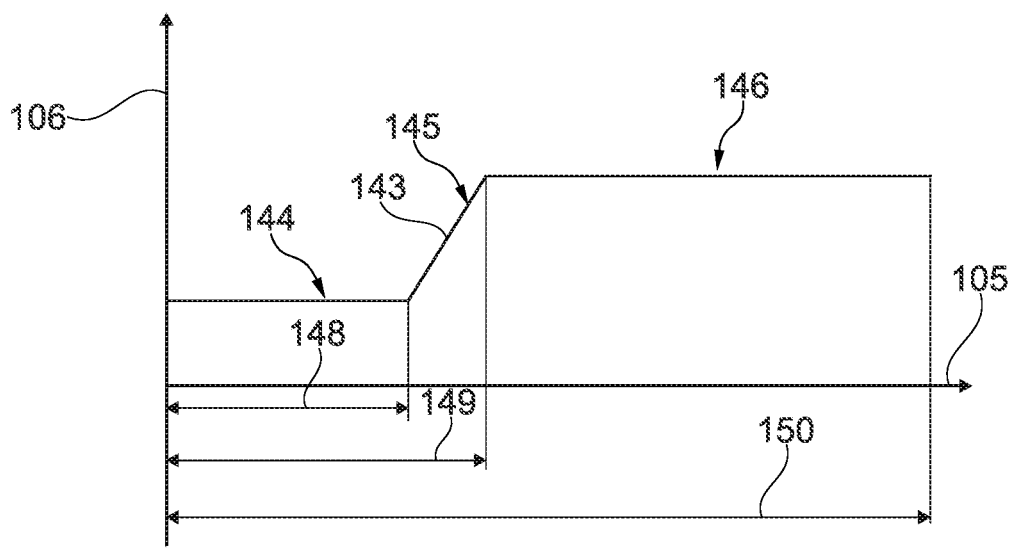

In the variant illustrated in FIG. 15, the proportion accounted for by grooves in the radially inner region 144 amounts to on average seventeen to twenty-seven percent (17-27%). In the radially central region 145, the proportion accounted for by grooves increases steadily. In the radially outer region 146, the proportion accounted for by grooves amounts to on average forty-five to fifty-five percent (45-55%). In the radially inner region 144 and in the radially outer region 146, the proportion accounted for by grooves remains constant over the radius or diameter of the friction surface 20.

Double arrow 148 indicates in FIG. 15 that the radially inner region 144 of the friction surface 20 extends from the inner diameter 101 in the x direction to thirty to forty percent (30-40%) of R. Double arrow 149 indicates that the radially central region 145 extends from the radially inner region 144 in the x direction to fifty to sixty percent (50-60%) of R. The dimension R is indicated in FIG. 15 by double arrow 150.

REFERENCE NUMERALS

1 Friction part
2 Friction lining
3 Friction lining piece
4 Friction lining piece
5 Friction lining piece
6 Friction lining piece
7 Friction lining piece
8 Groove
9 Groove
10 Groove
11 Groove
12 Groove
13 Groove
14 Groove
15 Groove
16 Groove 17 Groove
18 Inner edge
19 Outer edge
20 Friction surface
21 Branching point
22 Branching point
23 Connecting point
24 Connecting point
25 Connecting point
26 Outlet opening
27 Outlet opening
28 Outlet opening
30 Friction lining carrier
31 Friction part
33 Friction lining piece
34 Friction lining piece
35 Friction lining piece
36 Friction lining piece
38 Friction lining piece
39 Friction lining piece
40 Internal toothing
41 Double arrow
42 Double arrow
43 Double arrow
44 Double arrow
45 Groove set
46 Groove set
51 Friction part
53 Friction lining piece
54 Friction lining piece
61 Friction part
65 Friction lining piece
66 Friction lining piece
69 Friction lining piece
70 Friction surface
71 Friction part
81 Double arrow
82 Double arrow
83 Double arrow
85 Double arrow
88 Stem groove
89 Stem groove
90 Stem groove
91 Stem groove
92 Stem groove
93 Branch groove
94 Branch groove
95 Branch groove
96 Branch groove
97 Branch groove
100 Friction part
101 Inner diameter
102 Outer diameter
105 x axis
106 y axis
108 Course
109 Idealized course
111 Radially inner region
112 Radially central region
113 Radially outer region
115 Double arrow
116 Double arrow
117 Double arrow
121 Friction part
122 Course
123 Idealized course
124 Radially inner region
125 Radially central region
126 Radially outer region
128 Double arrow
129 Double arrow
130 Double arrow
131 Double arrow
132 Double arrow
141 Friction part
142 Course
143 Idealized course
144 Radially inner region
145 Radially central region
146 Radially outer region
148 Double arrow
149 Double arrow
150 Double arrow

The invention claimed is:
1. A friction part for a frictionally operating device, comprising:
 a friction lining carrier; and
 a friction lining comprising a plurality of pentagonal friction lining pieces arranged on the friction lining carrier to form an annular friction surface;
 wherein the pentagonal friction lining pieces are each arranged in a first row comprising same pentagonal friction lining pieces and a second row comprising same pentagonal friction lining pieces;
 wherein the annular friction surface comprises:
  an inner edge;
  an outer edge; and
  a groove set formed between the plurality of pentagonal friction lining pieces, the groove set comprising:
   a first stem groove extending from the inner edge to a first branching point between the inner edge and the outer edge;
   a first branch groove extending from the first branching point to a first connecting point between the inner edge and the outer edge;
   a second branch groove extending from the first branching point to a second connecting point between the inner edge and the outer edge;
   a third branch groove extending from a second branching point between the inner edge and the outer edge to the second connecting point; and
   a second stem groove extending from the second connecting point to the outer edge;
 wherein the first stem groove, the first branch groove, and the second branch groove are arranged in a y shape;
 wherein the second stem groove, the second branch groove, and the third branch groove are arranged in an inverted y shape;
 wherein the first stem groove or the second stem groove comprises a first groove width;
 the first branch groove, the second branch groove, or the third branch groove comprises a second groove width; and
 a ratio of the first groove width to the second groove width is greater than 0.5 and less than 6;
 wherein the annular friction surface comprises a radially central region between the radially inner region and the radially outer region; and
 a second proportion of the annular friction surface comprising the groove set varies over the diameter in the radially central region;
 wherein the radially inner region comprises 30-70% of a radial dimension R of the annular friction surface, the radially inner region extends at a minimum 50% of the radial dimension R; and the radially central region extends at a maximum 85% of the radial dimension R.

2. The friction part of claim 1, wherein the radially central region comprises 55-85% of the radial dimension R.

3. The friction part of claim 2, wherein a third proportion of the annular friction surface comprising the groove set is on average 45-55% of the annular friction surface in the radially inner region.

4. The friction part of claim 3, wherein a fourth proportion of the annular friction surface comprising the groove set steadily decreases in the radially central region.

5. The friction part of claim 2, wherein a fifth proportion of the annular friction surface comprising the groove set is on average 25-40% of the annular friction surface in the radially outer region.

6. The friction part of claim 1, wherein the radially central region comprises 35-75% of the radial dimension R.

7. The friction part of claim 6, wherein a sixth proportion of the annular friction surface comprising the groove set is on average 25-46% of the annular friction surface in the radially inner region.

8. The friction part of claim 6, wherein a seventh proportion of the annular friction surface comprising the groove set initially steadily increases, is then constant, and finally steadily decreases in the radially central region with increasing radius.

9. The friction part of claim 6, wherein an eighth proportion of the annular friction surface comprising the groove set in the radially central region is on average greater than 60%.

10. The friction part of claim 6, wherein a ninth proportion of the annular friction surface comprising the groove set in the radially outer region is on average 25-45% of the annular friction surface.

11. The friction part of claim 1, wherein the radially central region comprises 30-60% of the radial dimension R.

12. The friction part of claim 11, wherein a tenth proportion of the annular friction surface comprising the groove set is 15-30% in the radially inner region.

13. The friction part of claim 11, wherein an eleventh proportion of the annular friction surface comprising the groove set steadily increases in the radially central region with increasing radius.

14. The friction part of claim 11, wherein a twelfth proportion of the annular friction surface comprising the groove set in the radially outer region is on average 45-55% of the annular friction surface.

15. The friction part of claim 1, wherein the friction part is a plate for a multiplate clutch or a multiplate brake.

16. The friction part of claim 1, wherein a first proportion of the annular friction surface comprising the groove set is constant over a diameter of the annular friction surface in a radially inner region of the annular friction surface and in a radially outer region of the annular friction surface.

17. The friction part of claim 1, wherein each of the plurality of pentagonal friction lining pieces comprises rounded corners.

* * * * *